United States Patent [19]
Margotta et al.

[11] Patent Number: 5,513,227
[45] Date of Patent: Apr. 30, 1996

[54] READILY DISCONNECTABLE NOZZLE ARRANGEMENT FOR USE WITH A NUCLEAR REACTOR

[75] Inventors: Kenneth V. Margotta, Ellington; Russell R. Radant, Central Village; Douglas S. Porter, Simsbury, all of Conn.; Mark W. Yorns, Chicopee, Mass.

[73] Assignee: Combustion Engineering Inc., Windsor, Conn.

[21] Appl. No.: 263,196

[22] Filed: Jun. 21, 1994

Related U.S. Application Data

[63] Continuation-in-part of Ser. No. 999,408, Dec. 31, 1992, Pat. No. 5,323,428.

[51] Int. Cl.$^6$ .................................................. G21C 13/00
[52] U.S. Cl. ...................... 376/203; 376/204; 376/205; 376/206
[58] Field of Search .................................. 376/203, 204, 376/205, 206; 292/327; 285/109

[56] References Cited

U.S. PATENT DOCUMENTS

| | | | |
|---|---|---|---|
| 1,481,909 | 1/1924 | Jones | 92/206 |
| 2,177,040 | 10/1939 | Huhn | 308/237 |
| 2,586,871 | 2/1952 | Shields | 286/27 |
| 3,735,024 | 5/1973 | Walker, Sr. | 174/151 |
| 4,421,714 | 12/1983 | Dronkers | 376/204 |
| 4,454,957 | 6/1984 | Kwech et al. | 220/323 |
| 4,480,841 | 11/1984 | Schukei et al. | 277/1 |
| 4,586,719 | 5/1986 | Marsi et al. | 277/41 |
| 4,655,483 | 4/1987 | Margotta | 285/169 |
| 4,723,795 | 2/1988 | Shenoy | 285/138 |
| 4,815,884 | 3/1989 | Halliday, Jr. et al. | 403/13 |
| 5,092,364 | 3/1992 | Mullins | 137/614.05 |
| 5,110,536 | 5/1992 | Chevereau | 376/285 |

FOREIGN PATENT DOCUMENTS

| | | |
|---|---|---|
| 0263042 | 4/1988 | European Pat. Off. . |
| 2603682 | 3/1988 | France . |

*Primary Examiner*—Donald P. Walsh
*Assistant Examiner*—Meena Chelliah
*Attorney, Agent, or Firm*—Ronald P. Kananen; John H. Mulholland

[57] ABSTRACT

In order to reduce the time and difficulty of disassembling a seal arrangement in a cramped radioactive environment, a nozzle assembly hub is provided with a step bore which receives a seal arrangement, a compression collar, and a retaining nut which presses the seal arrangement into engagement with an inner wall portion of the hub and an outer wall portion of an ICI (in-core instrument) seal plug assembly. The ICI units remain connected to the seal plug assembly during normal disassembly operations. In this manner, the nozzle assembly may be disassembled by merely removing the retaining nut, compression collar, and seal arrangement and lifting the reactor head, along with the nozzle assembly, over the ICI units. The compression collar extends outside the retaining nut such that the collar can be engaged and compressed by an hydraulic loading tool while threading the retaining nut onto the hub.

25 Claims, 15 Drawing Sheets

FIG. 2
FIG. 3
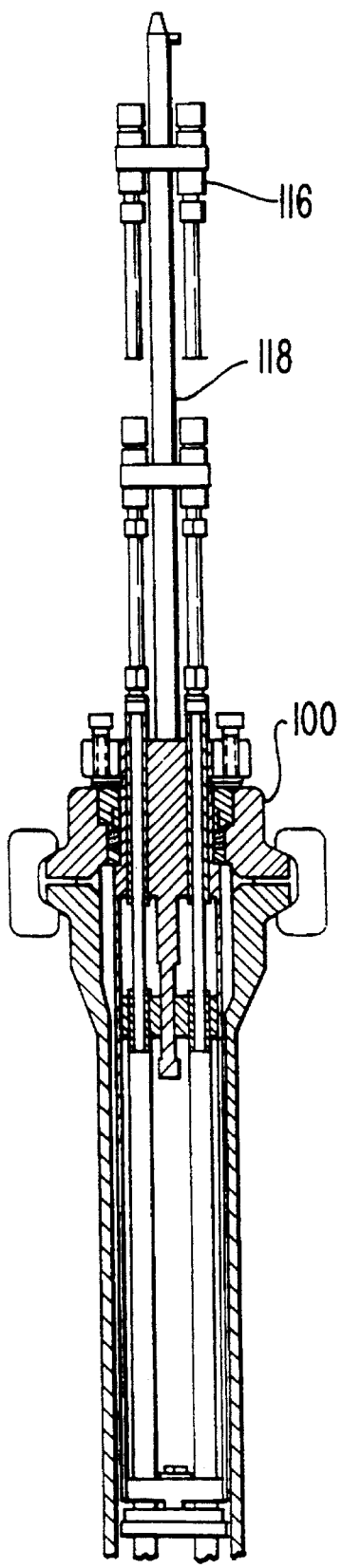
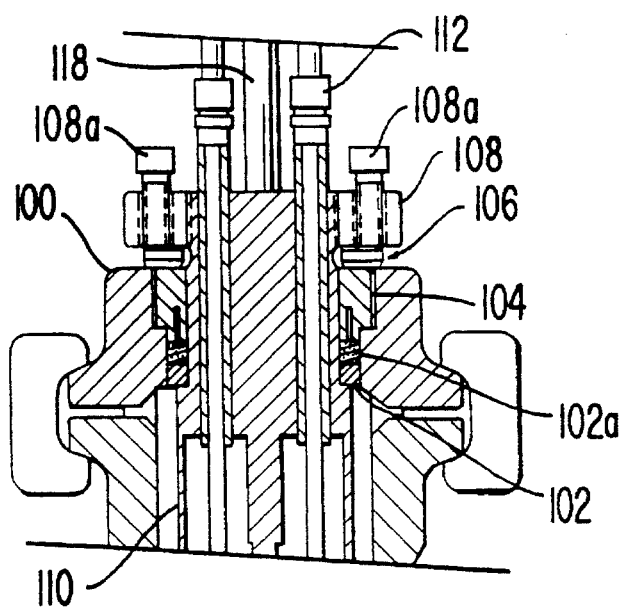

READILY DISCONNECTABLE NOZZLE ARRANGEMENT FOR USE WITH A NUCLEAR REACTOR

This application is a continuation-in-part of copending U.S. application Ser. No. 07/999,408, filed Dec. 31, 1992, set to issue as U.S. Pat. No. 5,323,428 on Jun. 21, 1994, and claims the benefit of the earlier filing date of such application under 35 U.S.C. §120.

BACKGROUND OF THE INVENTION

1. Field of the Invention

The present invention relates to nozzles assemblies and more specifically to nozzle assemblies which enable quick and easy connection/disconnection in cramped and hazardous environments such as encountered in nuclear reactors.

2. Description of the Prior Art

It is essential that a hermetic, radiation proof, seal be maintained between the interior and exterior of a pressure vessel such as a nuclear reactor. It is also necessary to monitor the operations of a reactor using In-Core Instruments (ICI). However, this latter requirement necessitates the provision of nozzles through which the instruments can be sealingly introduced into the core. Examples of such arrangements are shown in U.S. Pat. No. 4,723,795 issued on Feb. 9, 1988 in the name of Shenoy and U.S. Pat. No. 4,655,483 issued on April 7, 1987 in the name of Margotta. These documents disclose techniques for providing fluid tight connections between a nozzle and a column which is concentrically supported within the nozzle.

FIG. 1 shows a less preferred embodiment of the type of nozzle to which the present invention pertains. This arrangement is such as to provide a fluid-tight, radiation proof, seal for a plurality of ICI (In Core Instruments) and allows the operative connection with external controls and monitoring arrangements.

This arrangement features the use of a GRAYLOC hub 10 which is clamped securely to a GRAYLOC flange 12 formed at the upper end of an ICI nozzle 14. However, with this arrangement when it is required to disassemble the same, the GRAYLOC clamp 16 is unbolted and each individual ICI nut 18 is then removed and the individual ICIs are then clustered together under a bullet nose. The above-mentioned GRAYLOC hub and GRAYLOC clamp are products of the Gray Tool Company, Houston, Texas.

FIGS. 7 and 8 are sectional views of the two main styles of conventional ICI flanges currently in use at nuclear power plants. Typically, there are 6 to 10 ICI flanges on the reactor vessel closure head, each of which houses up to six ICIs. FIG. 7 shows a standard bolted flange assembly 200 mounted to a closure head nozzle 201 of a reactor head. The standard bolted flange assembly 200 includes a mating flange 202 having a plurality of circumferentially-spaced holes for receiving nut and bolt assemblies 203. A flexitallic gasket 204 is fitted between the mating flange 202 and the closure head nozzle 201 to effect a fluid-tight, radiation proof seal. A plurality of ICI assemblies 205 are mounted to the mating flange 202 and secured in place with drive nuts 206. Gaskets 207 ensure a fluid and radiation tight seal between the ICI assemblies 205 and the mating flange 202.

During refueling and servicing of a reactor plant using the standard bolted flange assemblies 200, the nut and bolt assemblies 203 and each of the individual ICI nuts 206, along with the respective seals 204 and 207, must be removed. The ICI assemblies must be removed from the mating flange 202 regardless of whether the ICIs are scheduled to be replaced since the lower portions of the ICI assemblies 205 disposed within the pressure vessel remain in place while the closure head (not shown), along with the nozzles 201, is lifted off of the pressure vessel. The mating flange 202 is typically very heavy and unwieldy requiring two or more people to manipulate. Accordingly, this arrangement requires a significant amount of time and effort to disassemble and reassemble each time the head of the reactor is removed.

The other type of conventional flange assembly is the GRAYLOC flange assembly shown in FIG. 8. This assembly includes a GRAYLOC hub 210 positioned over the opening of the closure head nozzle 211. The closure head nozzle 211 includes a GRAYLOC flange 212 which is clamped securely to the hub 210 by a GRAYLOC clamp 213. A metal GRAYLOC seal ring 214 is positioned between the GRAYLOC flange 212 and the hub 210. The GRAYLOC clamp 213 includes a pair of large matching clamshell clamps secured together with four stud and nut sets inserted through holes 215. The ICI assemblies 216 are secured to the GRAYLOC hub 210 by drive nuts 217 and are sealed against leakage by GRAFOIL gaskets 218 which are compressed by torquing the drive nuts 217 to a high value.

During refueling and servicing of a reactor with the conventional GRAYLOC flange assembly, it is necessary to unbolt and remove the GRAYLOC clamps 213 prior to lifting the ICI assembly from the closure head nozzle 211. As with the embodiment of FIG. 7, each of the individual ICI nuts 217, along with the seals 218, are removed from the hub 210 regardless of whether the ICIs are scheduled to be replaced. The GRAYLOC hub 210 and clamps 213 are quite heavy and difficult to maneuver over the comparatively delicate instrumentation. This operation requires two or more people to complete. The clamps and stud and nut sets require a significant amount of work to manipulate, and the drive nuts 217 at each of the ICI locations require substantial torque to effect a seal.

The above-described conventional flange assemblies have significant drawbacks in that the disassembly process is both labor intensive and time consuming. The disassembly process is especially tedious because it is carried out in very cramped conditions and in a radioactive environment. Accordingly, the operators are required to wear protective suiting and must be careful to monitor the amount of time for which they are exposed to the radiation.

Therefore, there is a need for an arrangement which can reduce both the effort and time required to achieve the disassembly of an ICI nozzle which is carried out each time a refueling or instrument change is required, in order to reduce the reactor down time and, more importantly, to reduce the health risks associated with working in the above mentioned hazardous environment.

SUMMARY OF THE INVENTION

It is an object of the present invention to provide a nozzle assembly for use with nuclear reactors and the like type of pressure vessels, which nozzle design enables very quick disassembly and which reduces the difficulty and amount of physical effort required for disassembly.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the device of a first embodiment of this invention may comprise a seal arrangement which features a modified GRAYLOC hub in which a stepped bore receives a grafoil seal arrangement and a retaining nut which presses the grafoil seal into engagement with an inner wall portion of the hub and outer wall portion of an ICI (in core instrument) supporting column. A loading ring is threaded onto a portion of the column. Bolts associated with the ring are screwed down onto a belleville washer which is disposed between the loading ring and the top of the retaining nut for maintaining a desired amount of load on the seals irrespective of thermal variations.

More specifically, a first aspect of the invention includes a device which features a hub which is clamped to a flange formed on the upper end of a nozzle in a manner to establish a hermetic seal between the hub and the flange, the hub being formed with a stepped bore therein through which a column member extends; seal means disposed in the bore about the column member; a retaining nut threadedly received in the stepped bore, the retaining nut being adapted to press the seal means into sealing engagement with a wall portion of the stepped bore and a wall portion column member which is located within the stepped bore in a manner which establishes a hermetic seal between the hub and the column member; a resilient washer disposed on the upper side of the retaining nut; and an annular load ring which is threadedly received on a portion of the column, the load having a plurality of through holes in which bolts are threadedly received for adjusting the pressure applied by the resilient washer to the top of the retainer nut.

A second aspect of the present invention includes a sealing arrangement for a device having a nozzle portion and a column member disposed through the nozzle portion, which features: a hub which is clamped to a flange formed on the upper end of the nozzle in manner to establish a hermetic seal between the hub and the flange, the hub being formed with a stepped bore through which the column member extends; seal means disposed in the bore about the column member, the seal being supported by a seal carrier; a retaining nut threadedly received in the stepped bore, the retaining nut being adapted to press the seal into sealing engagement with a wall portion of the stepped bore and a wall portion column member which is located within the stepped bore in a manner which establishes a hermetic seal between the hub and the column member; and an annular load ring which is threadedly received on a portion of the column, the load ring including means for selectively applying a force to the top of the retainer nut.

A third aspect of the present invention includes a nuclear reactor including an in-core-instrument, a head which is lifted when the reactor is refuelled, and a nozzle arrangement which includes a column arrangement through which the in-core-instrument is disposed, the nozzle comprising: a GRAYLOC flange which is associated with the nozzle; a GRAYLOC hub releasably connected to the GRAYLOC flange; a stepped bore formed in the GRAYLOC hub through which the column arrangement is disposed; a grafoil seal arrangement disposed in the stepped bore; a retaining nut which is threadedly received in the stepped bore and which can apply a pressure to the grafoil seal arrangement; and loading means threadedly received on the column arrangement for applying pressure on the retaining nut.

A further aspect of the invention comes in that the arrangement set forth above further features: an elastomeric spacer which can be inserted into the stepped bore when the retaining nut is removed, the elastomeric spacer protecting threads which are formed on the wall of the stepped bore and engaging the external wall of a bullet shaped cover which is placed over the top of the column arrangement when the nuclear reactor is conditioned for a predetermined operation.

In accordance with a second embodiment of the present invention, the device may comprise a nozzle assembly for use with a sealed containment vessel, such as a nuclear reactor. The nozzle assembly includes a hub clamped to a flange formed on the upper end of a nozzle in a manner to establish a hermetic seal between the hub and the flange, the hub being formed with a stepped bore therein. A plug member extends through the stepped bore in the hub. A seal member is disposed in the bore about the plug member for creating a seal between the plug member and the hub. A compression collar is disposed about the plug member, the compression collar having a first end adapted to engage and press the seal member into sealing engagement with the stepped bore, a second end opposite the first end, and a flange intermediate the first and second ends. A retaining nut is threaded onto the hub, the retaining nut having a retaining portion engaging the flange of the compression collar to maintain the collar in pressing engagement with the seal means to create a hermetic seal between the hub and the plug member.

In the preferred embodiment, the second end of the compression collar extends outside the retaining nut such that the collar can be engaged and compressed by an external source, such as a hydraulic loading tool, prior to threading the retaining nut onto the hub. The plug member includes a plurality of bores extending therethrough, and a plurality of instrument guide tubes extending through the bores in the plug member, the guide tubes being hermetically sealed to the plug member.

The preferred embodiment also includes a seal carrier disposed in the bore of the hub about the plug member, and at least one graphite containing sealing member carried by the seal carrier. The seal carrier includes a plurality of J-shaped slots to facilitate installation and removal of the seal member.

In a further aspect of the second embodiment of the present invention, in accordance with its objects and purposes, the device hereof may also comprise a nuclear reactor including an in-core-instrument, a head which is lifted when the reactor is refuelled, a nozzle through which the in-core-instrument is disposed, and a nozzle arrangement as described above. The nozzle arrangement includes a compression collar disposed about the plug member, the compression collar having a first end for engaging and pressing the seal member into sealing relationship with the hub and the plug member, a second end opposite the first end, and an abutment flange intermediate the first and second ends. A retaining nut is threadedly received on the hub and engages the abutment flange on the compression collar to retain the collar in pressing engagement with the seal member.

It is also preferred that the second end of the compression collar extends outside the retaining nut such that the collar can be engaged and compressed by an external source, such as a hydraulic loading tool, while threading the retaining nut onto the hub. The plug member includes a stepped portion for receiving the seal member, the stepped portion engaging the seal means to provide a self-sealing tendency when the reactor is pressurized.

In accordance with a further aspect of the second embodiment of the present invention, a bullet nose is provided for creating a sealed chamber about the instrument guide tubes above the plug member during refueling of the reactor, the bullet nose having an upper tapered end and a lower end for sealing engagement with the plug member. The bullet nose and the plug member both have a smaller diameter than the stepped bore formed in the hub so that the head can be lifted up over the bullet nose and plug member when refueling.

In accordance with a further aspect of the second embodiment of the present invention, a loading tool is provided for engaging and compressing the compression collar while threading the retaining nut onto the hub. The loading tool comprises a tool block for engaging the compression collar and a plurality of load arms connected between the tool block and the reactor. The tool block includes pistons for receiving fluid pressure for creating a load on the compression collar while threading the retaining nut onto the hub.

In a further aspect of the second embodiment of the present invention, the invention may comprise a method of connecting an instrument assembly to a nozzle opening of a sealed containment vessel. The method includes the steps of: providing a seal plug assembly with at least one instrument guide tube extending therethrough; inserting the seal plug assembly into a hub of the nozzle opening so that the instrument guide tube extends into the sealed vessel; placing a compression collar about the seal plug assembly; compressing the compression collar to form a seal between the seal plug assembly and the hub of the nozzle opening; and threading a hold down nut onto the hub of the nozzle opening after the compression collar is compressed so as to engage and maintain compression in the compression collar.

In the preferred method, the step of compressing the compression collar comprises engaging a first portion of the compression collar with a hydraulic compression tool. The step of threading the hold down nut comprises engaging a second portion of the compression collar with the hold down nut while the compression collar is being compressed by the hydraulic compression tool.

BRIEF DESCRIPTION OF THE DRAWINGS

The present invention will become more clearly appreciated as the disclosure of the present invention is made with reference to the accompanying drawings wherein:

FIG. 2 is a sectional view showing a nozzle arrangement according to a first embodiment of the present invention;

FIG. 3 is a an enlarged view showing the elements which are essential to the nozzle arrangement according to the first embodiment of the present invention;

DETAILED DESCRIPTION OF THE PREFERRED EMBODIMENTS

Figure 1:
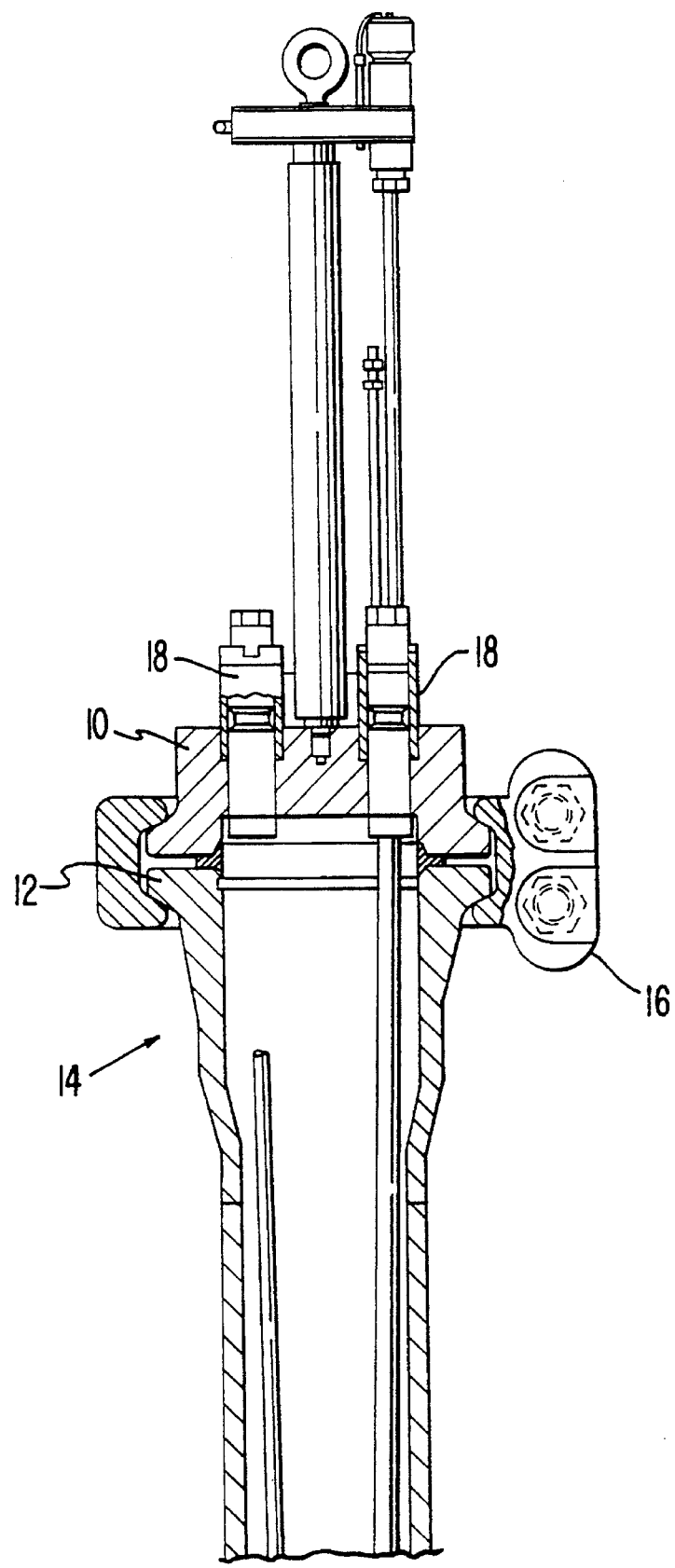
FIG. 1 is a sectional view showing the less preferred GRAYLOC nozzle assembly discussed in the opening paragraphs of the instant disclosure.
Figure 4:
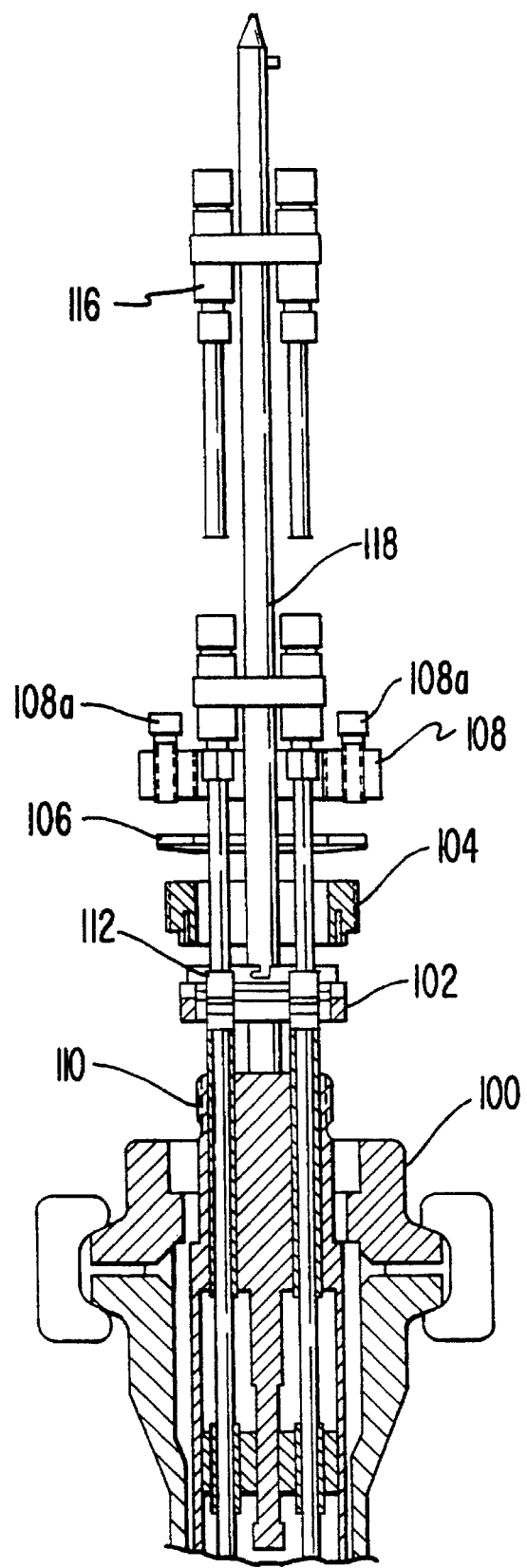
FIG. 4 is an exploded sectioned view showing the elements which characterize the first embodiment of the present invention shown.

Reference will now be made in detail to the preferred embodiments of the invention, examples of which are illustrated in the accompanying drawings.

FIGS. 2 to 5 show details of a first embodiment of the present invention. This embodiment features a basic combination of a modified GRAYLOC hub 100, a seal carrier 102, a retaining nut 104, a belleville washer 106, a loading ring 108 and a column assembly 110. The modified GRAYLOC hub 100 forms a pressure boundary at the top of the nozzle. It has a clearance fit with the column assembly 110 and includes a stepped bore the upper larger diameter portion of which is threaded to react to the loading of the retaining nut 104. It should be noted that with the present invention disassembly of the GRAYLOC flange is not required for removal of the reactor head.

In this arrangement the column assembly 110 serves to allow the penetration of a plurality of ICIs (In-Core-Instruments) into the interior of the reactor core. The instant embodiment is such as to support six ICIs and provides guidance for the guide tube clusters which are associated with the ICIs. The ICI column assembly 110 includes six ½" SWAGELOC fittings 112 and bolts to the guide tube cluster. The SWAGELOC are not loosened unless the ICI are to be discarded and replaced with new units.

The seal carrier 102 supports grafoil seals 102a and protects the same from damage during installation. A special T-handle tool is used to engage J-slots (see FIG. 4) which are formed in a vertical web of the seal carrier 102 during installation and removal. As shown, the seal carrier 102 is disposed in the lower portion of a stepped bore formed in the modified GRAYLOC hub 100.

The retaining nut 104, which is threadedly received in the upper portion of the stepped bore of the GRAYLOC hub 100, is such as to react against the uplift of the column 110 and compress the grafoil seals 102a. The retaining nut 104 is formed with spanner holes in the upper surface thereof and does not require the application of large amounts of torque in order to thread the same into and out of place.

The belleville washer 106 is provided to ensure that a load is maintained on the grafoil seals 102*a* under all thermal conditions and further prevents loosening of the load ring 108.

As will be appreciated, load ring 108 is provided to apply a load to the grafoil seals 102*a*. In this embodiment it threads onto a threaded portion of the column assembly and is provided with six ⅝" bolts 108*a* which can be screwed down onto the upper surface of the belleville washer 106 in order to apply the required compressive force to the grafoil seals 102*a*.

In this instance the ICI connectors 116 are staggered at three different elevations and are mounted on an integral bullet nose locking rod 118. During routine disassembly of the flange, there is no need to remove the connectors.

Figure 5:
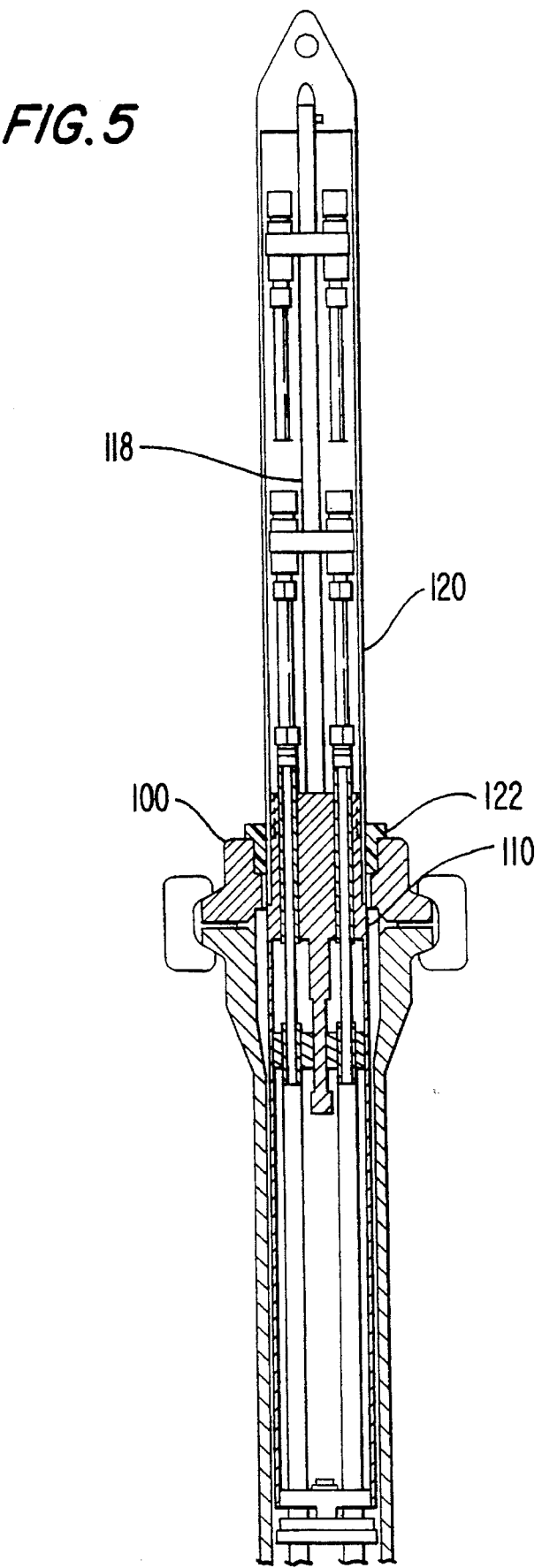
FIG. 5 is a sectional view showing the nozzle arrangement of FIG. 2 after a bullet nose has been fitted over the ICI instruments.

FIG. 5 shows the nozzle covered with a bullet nose 120 such as during refueling when the reactor head is lifted. As will be noted, in this instance a nylon thread protector 122 is inserted into the upper section of the stepped bore to ensure that insertion of the lower open end of the bullet nose 120 does not damage the threads and reduce the integrity of the sealing effect which is provided thereby.

Figure 6A:
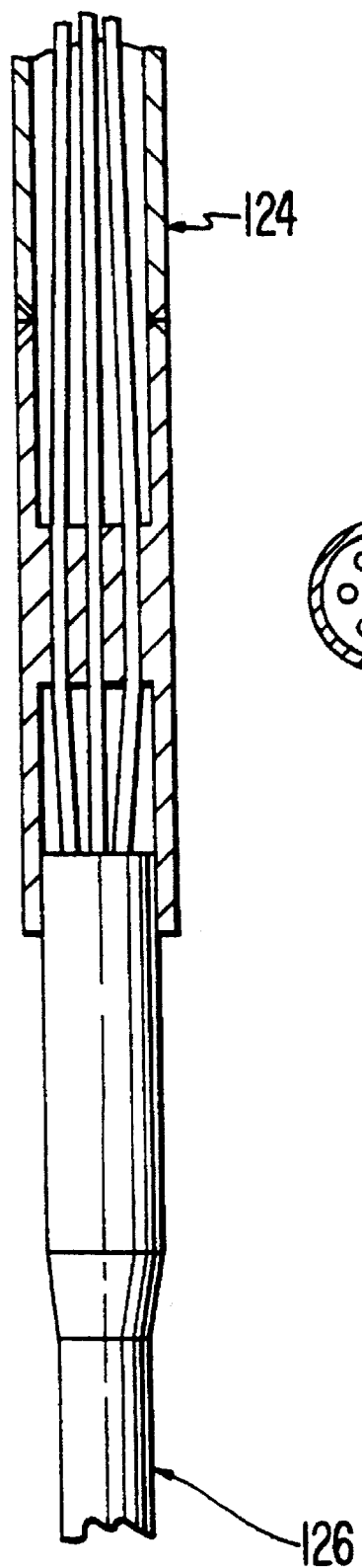
FIG. 6A is a sectional view showing the structure of a detector seal plug associated with one of the ICI instruments.
Figure 6B:
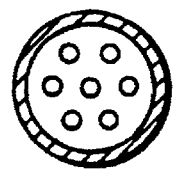
FIG. 6B is a sectional view of the seal detector plug shown in FIG. 6A.

FIG. 6A is a partially sectional view of a detector seal plug which forms part of the instant embodiment. FIG. 6B is an end view of the seal plug of FIG. 6A. As shown, this device includes a support tube 124 which is welded to a swaged detector 126 and includes a plurality of leads which are brazed to a header in the manner illustrated. As this element is not directly connected with the invention, no further disclosure will be given for brevity.

Figure 7:
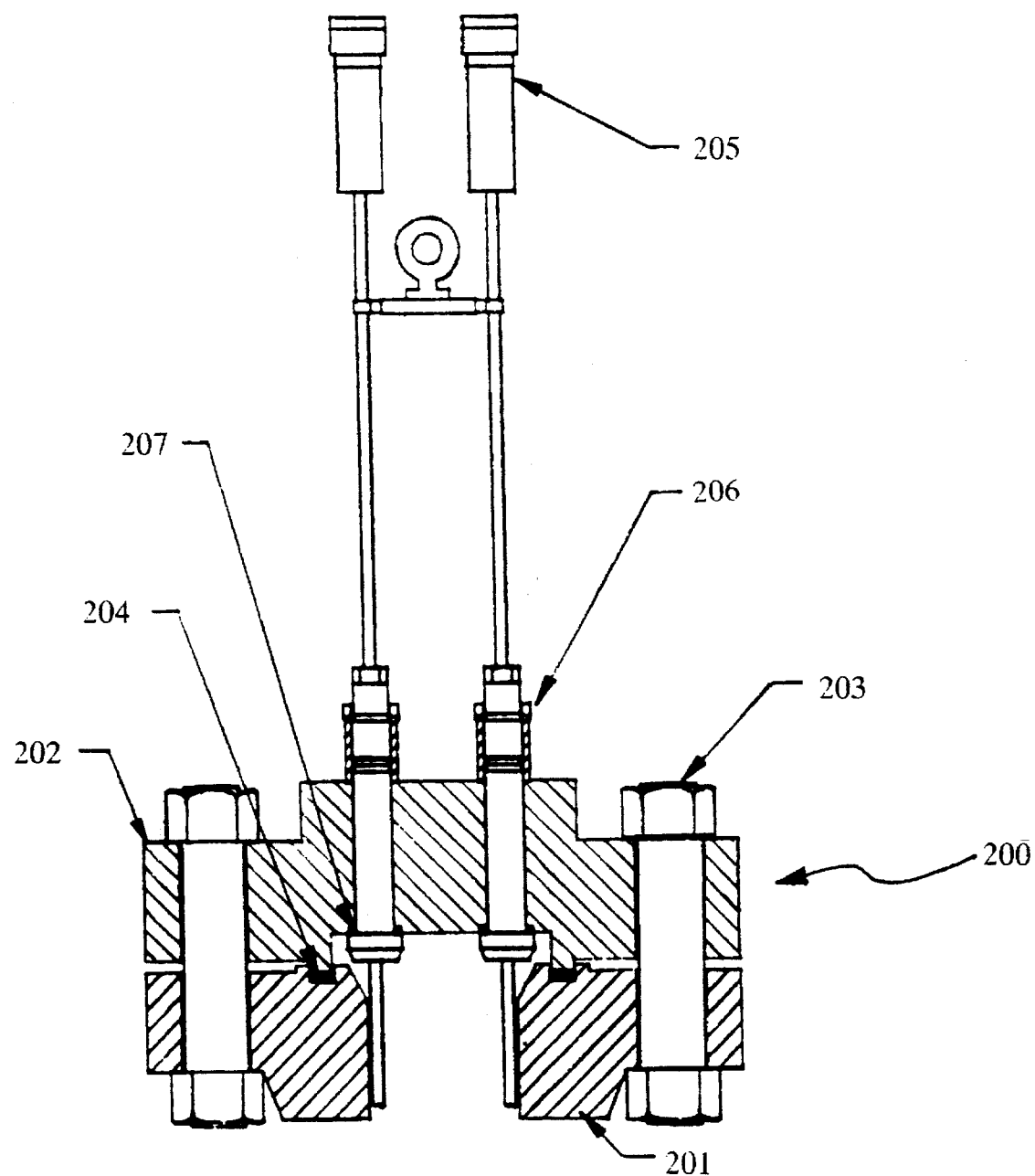
FIG. 7 is a sectional view of a conventional standard bolted flange ICI nozzle assembly.
Figure 8:
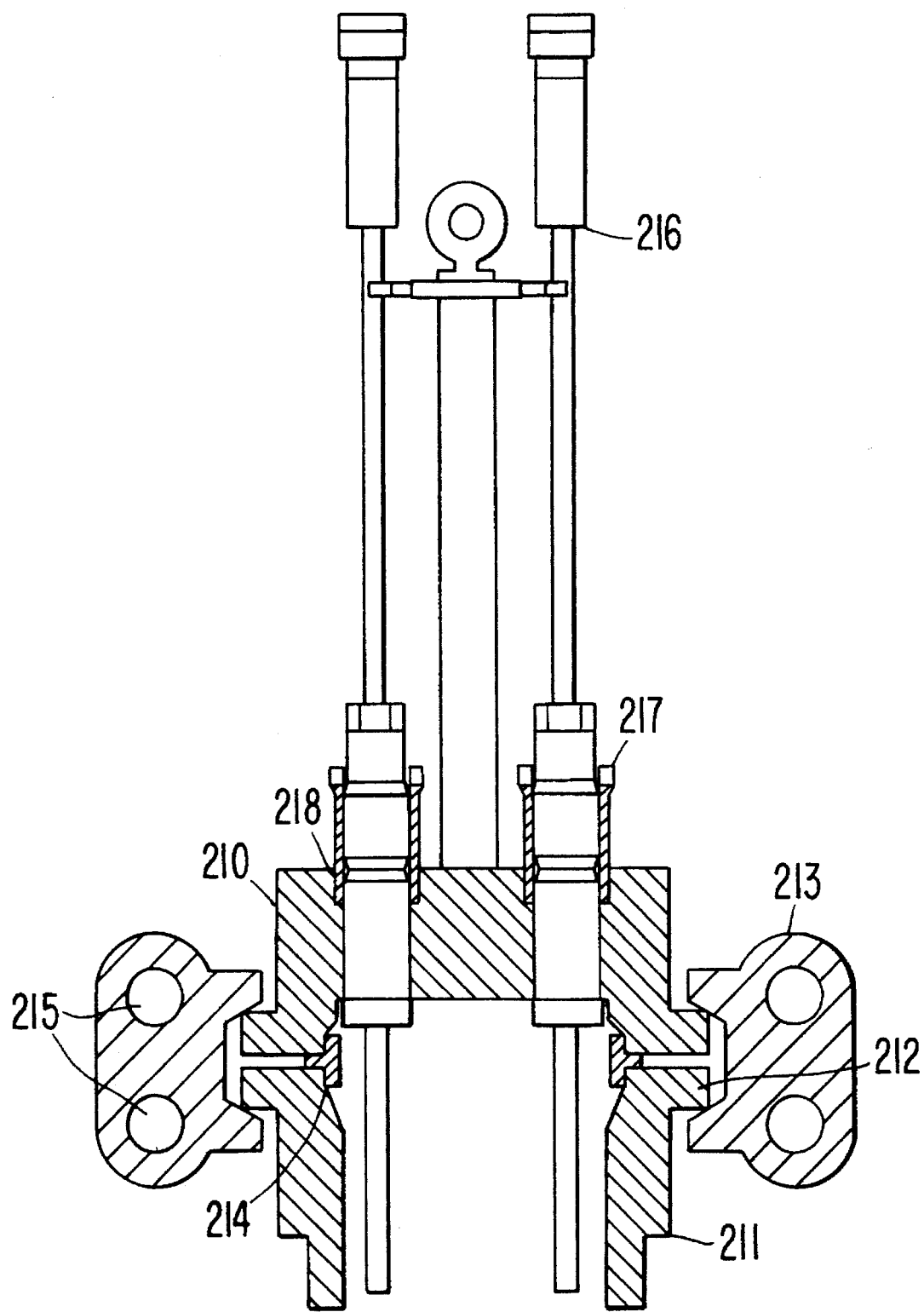
FIG. 8 is a sectional view of a conventional GRAYLOC flange ICI nozzle assembly.

FIGS. 9 through 13B, 15 and 16 show details of a second embodiment of the present invention. The second embodiment is shown in conjunction with a GRAYLOC flange assembly, such as that shown in FIG. 8, with like reference numerals used to refer to like elements in FIGS. 8 through 16. However, it should be understood that with minimal modifications the second embodiment could also be adapted for use with a bolted flange assembly, such as that shown in FIG. 7. The benefits of the quick locking mechanism of the present invention are substantially the same for either the bolted or the GRAYLOC flange assemblies.

Figure 9:
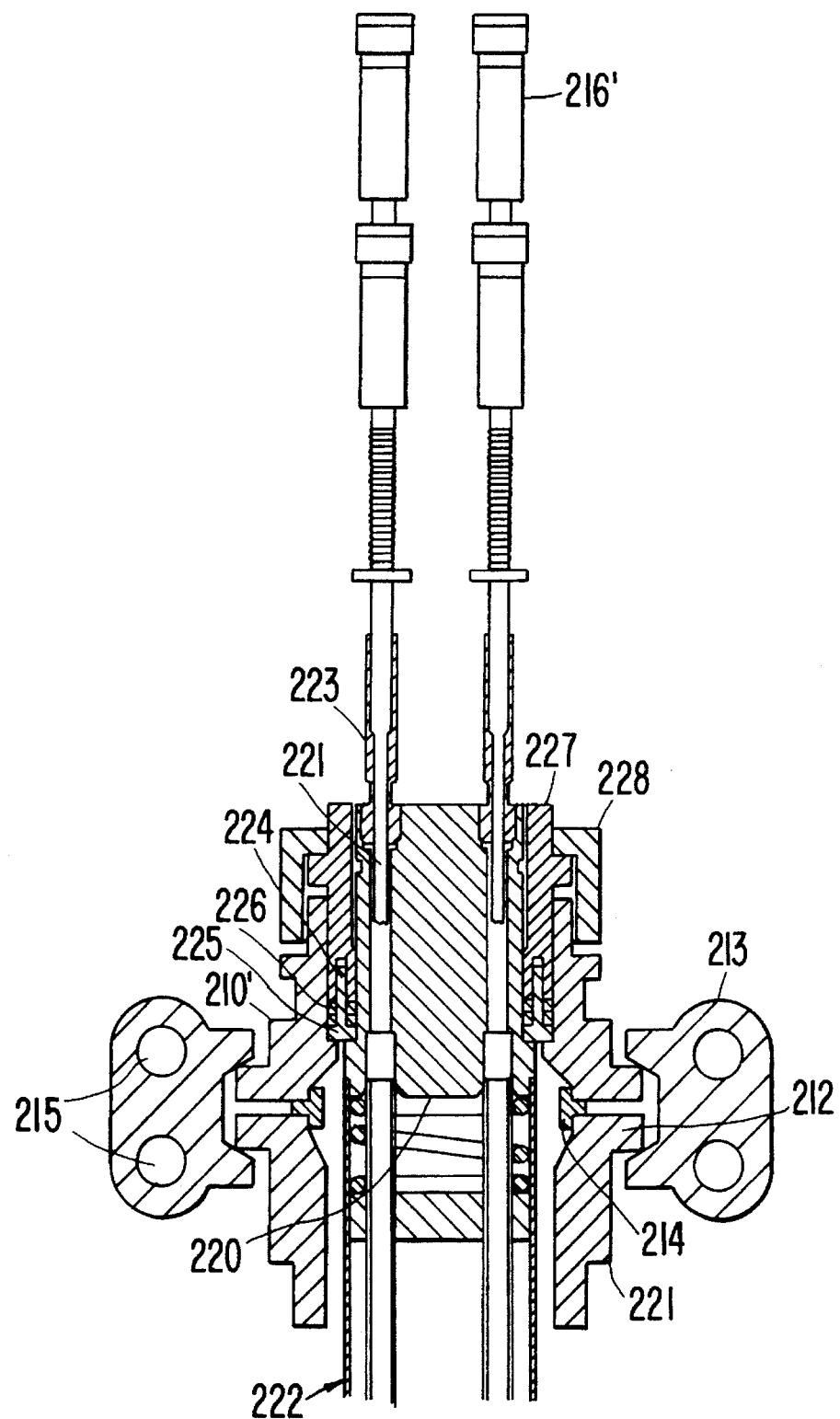
FIG. 9 is a sectional view of a GRAYLOC flange ICI nozzle assembly according to a second embodiment of the present invention.

As shown in FIG. 9, the second embodiment includes a GRAYLOC hub 210' positioned over the opening of the closure head nozzle 211. The closure head nozzle 211 includes a GRAYLOC flange 212 which is clamped securely to the hub 210' by a GRAYLOC clamp 213. A metal GRAYLOC seal ring 214 is positioned between the GRAYLOC flange 212 and the hub 210'. The GRAYLOC clamp 213 includes a pair of large matching clamshell clamps secured together with four stud and nut sets inserted through holes 215.

The GRAYLOC hub 210' has an open center geometry. A seal plug assembly 220 is received within the open center of the hub 210' and includes passages therethrough for receiving ICI guide tubes 221 of the ICI assemblies 216'. The seal plug assembly 220 fits on top and is secured to the guide tube cluster 222 which extends into the reactor vessel. In effect, the seal plug assembly extends the individual ICI guide tubes 221 up through one large permanent seal plug, rather than individual seal plugs for each guide tube, as in the prior art.

At the top of the seal plug assembly, there is a group of SWAGELOC-type fittings 223 which restrain and form a seal with each ICI. These fittings 223 are disconnected only if the individual ICIs are scheduled for replacement. The SWAGELOC-type fittings 223 form fluid and radiation tight seals between the ICI tubes and the seal plug assembly 220 while enabling the ICI tubes to be a constant diameter throughout their full length.

Figure 10A:
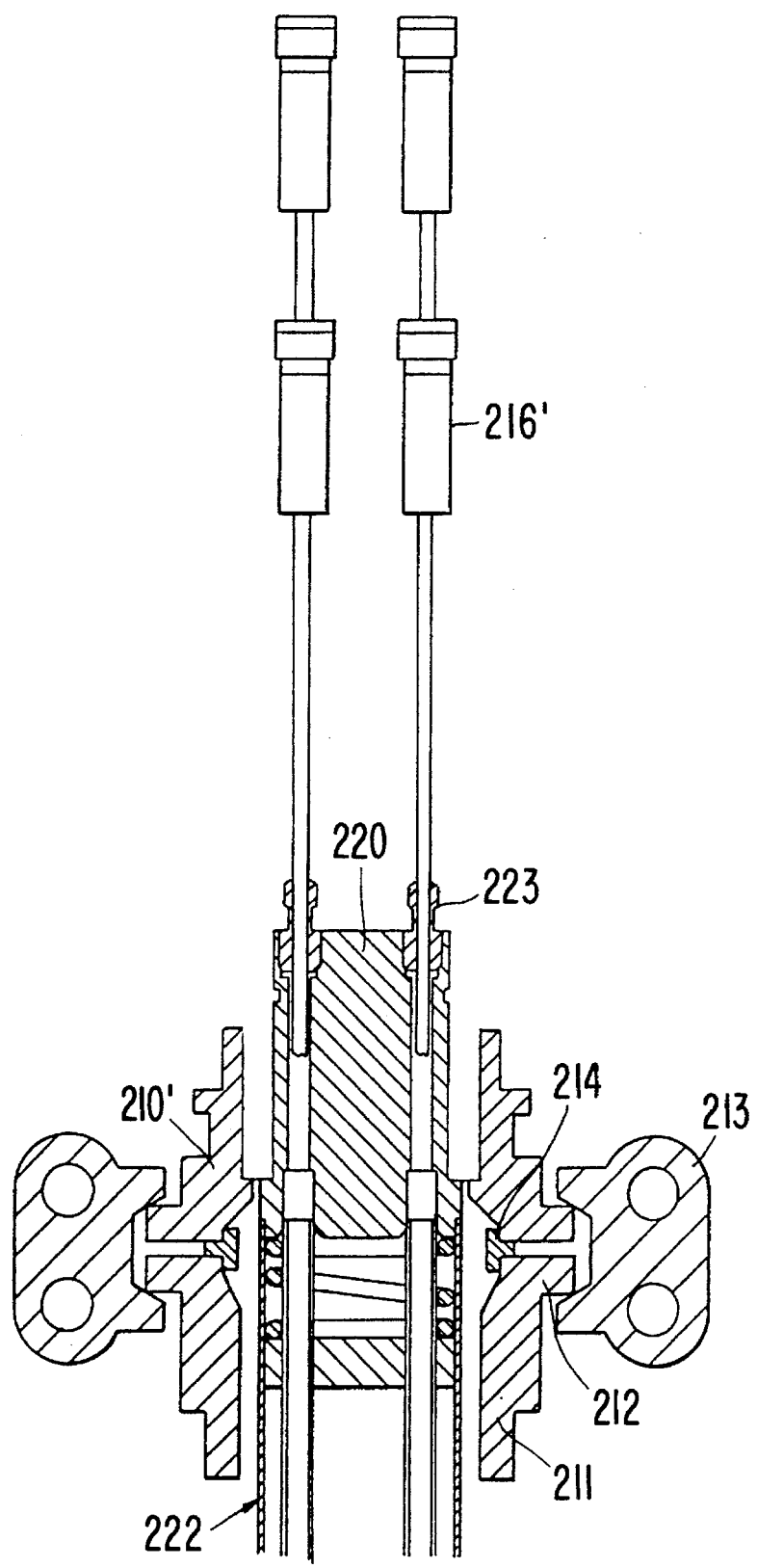
FIG. 10A is a sectional view of the GRAYLOC flange ICI nozzle assembly of FIG. 9 in a partially disassembled state.
Figure 10B:
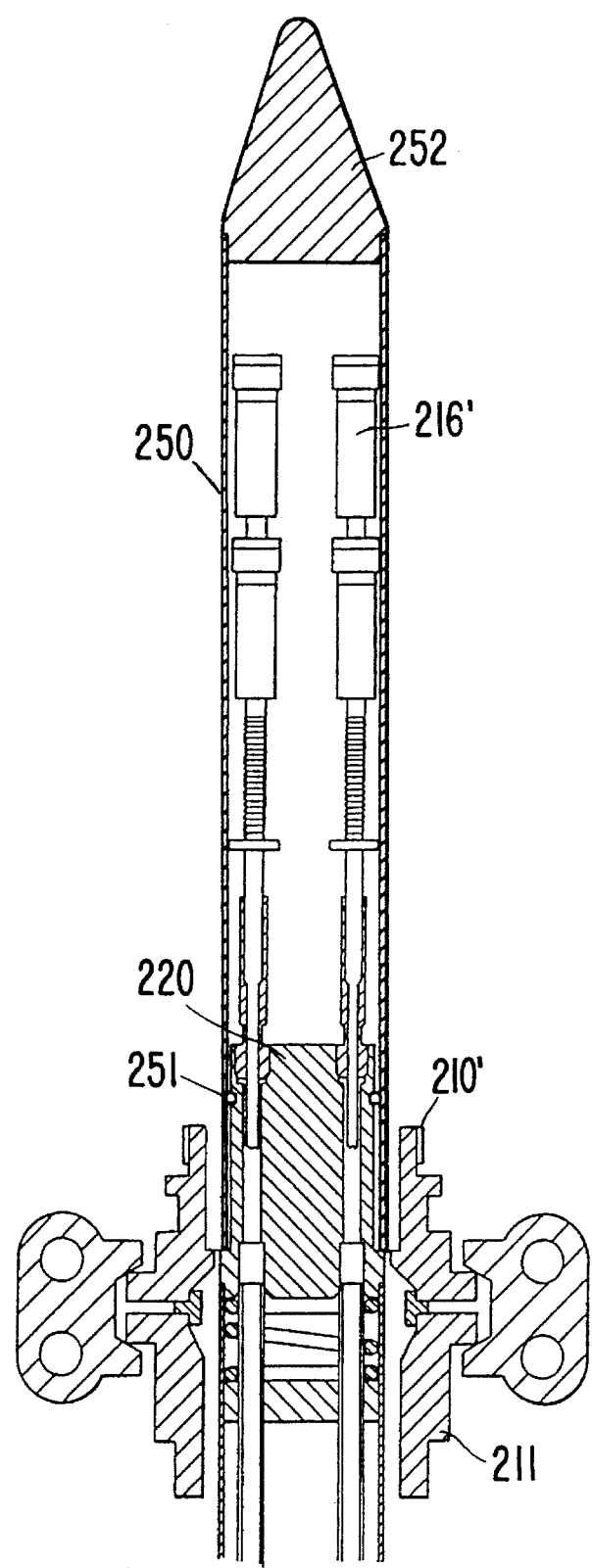
FIG. 10B is a sectional view similar to FIG. 10A showing a bullet nose positioned over the ICI assembly.

During normal outages, the fittings 223 are not disturbed, but rather, are left intact as shown in FIG. 10A. A bullet nose 250 (shown in FIG. 10B) is temporarily positioned over the ICI assemblies 216' to seal and protect the individual ICIs when the closure head (not shown) is removed from the pressure vessel. After the bullet nose 250 is sealingly secured to the seal plug assembly 220, the closure head (not shown) and the nozzle assembly 211 can be lifted from the pressure vessel and slid up over the top of the ICI assembly 216' and bullet nose 250 Thus, the entire ICI assembly 216' along with the seal plug 220, remains in place while the closure head (not shown) and nozzle 211 are removed from the pressure vessel.

No individual seal plugs for the guide tubes 221 are necessary with the present invention because the ICI tubes all extend through the single seal plug 220 which remains in position during refueling. The bullet nose 250 protects the ICI assembly within a sealed chamber created by an O-ring fluid seal 251 between the bullet nose and the seal plug 220. The sealed chamber within the bullet nose is important to protect the ICIs from water and mechanical damage during refueling when the entire reactor is covered in water to reduce radiation exposure. A tapered top 252 of the bullet nose 250 facilitates positioning the closure head and nozzle 211 over the ICI assembly after refueling.

Figure 11A:
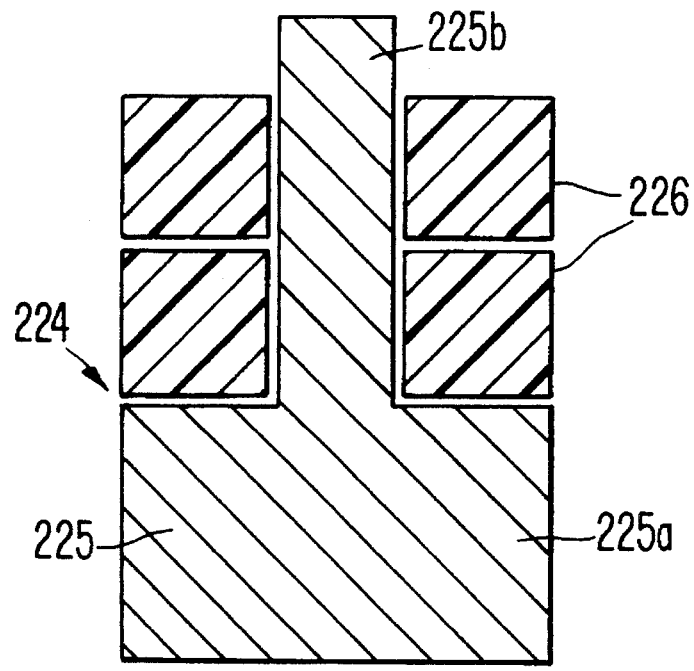
FIG. 11A is an enlarged sectional view of a seal carrier assembly according to the second embodiment.
Figure 11B:
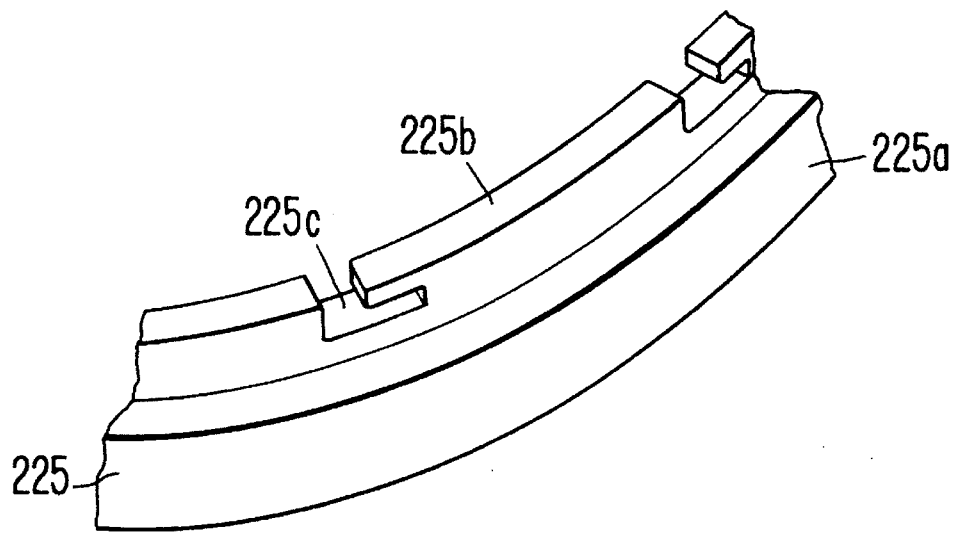
FIG. 11B is a cutaway perspective view of the seal carrier assembly of FIG. 11A.

A seal carrier assembly 224 (FIGS. 9, 11A and 11B) includes a seal carrier 225 and GRAFOIL seal rings 226. The GRAFOIL rings 226 fill and seal the annulus between the column assembly 220 and the GRAYLOC hub 210'. As shown in FIGS. 11A and 11B, the seal carrier 225 has an inverted T-shaped cross-section with a lower portion 225*a* and an upper vertical web portion 225*b*. The upper portion 225*b* of the seal carrier 225 is equipped with J-slots 225*c* which are engaged by a special installation/removal tool (not shown). The carrier 225 allows the seal rings 226 to be easily installed without damage. The carrier 225 also facilitates removal of the seal rings 226 during disassembly.

An open-centered compression collar 227 (FIG. 9) is fitted about the seal plug assembly 220 above the seal carrier assembly 224. The compression collar 227 is secured in position by a threaded hold down nut 228. A special hydraulic loading tool 230 (shown in FIGS. 13A and 13B and discussed below) is used to drive the compression collar 227 into the GRAFOIL seal rings 226. While the loading tool is pressurized, the nut 228 is spun down hand tight to retain the compression of the GRAFOIL seal rings 226. There are virtually no torque requirements on the nut 228 since the nut 228 need only be hand tight before the loading tool is removed.

Figure 12A:
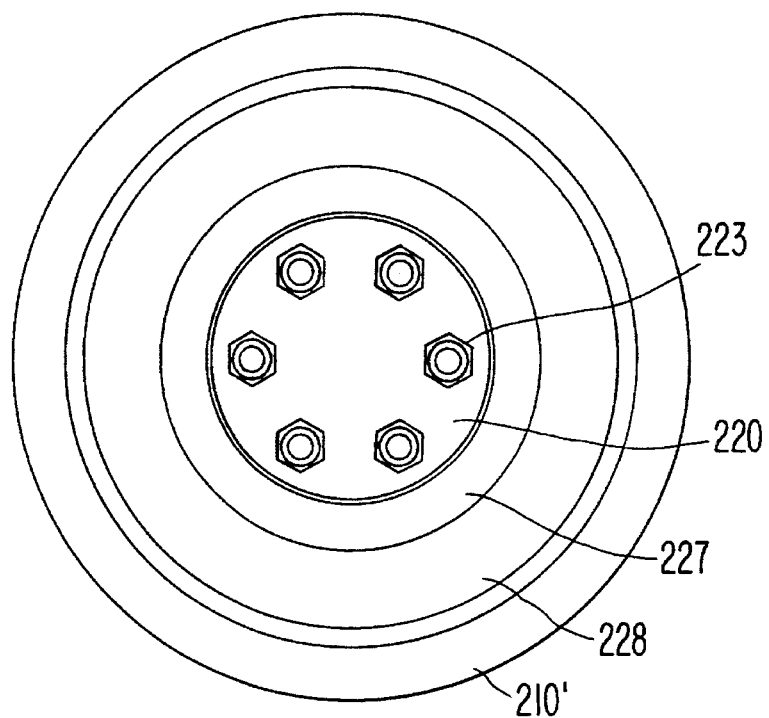
FIGS. 12A and 12B are plan and sectional views, respectively, of the nozzle assembly according to the second embodiment.
Figure 12B:
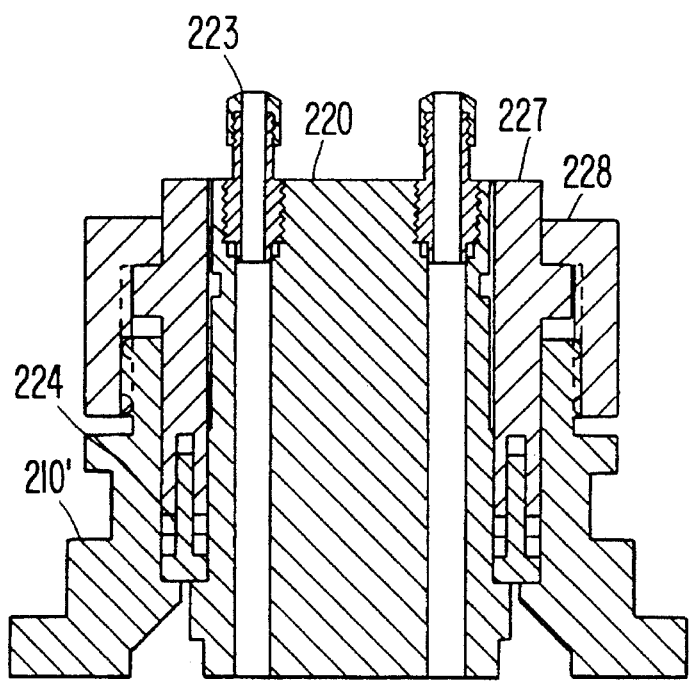
Figure 13A:
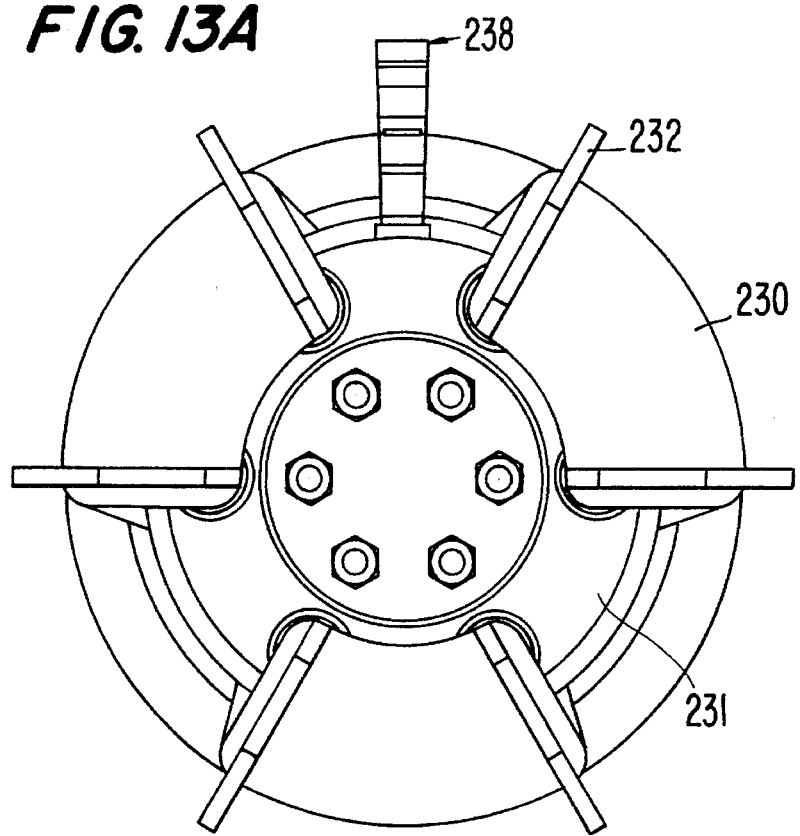
FIGS. 13A and 13B are plan and sectional views, respectively, of the nozzle assembly shown in FIGS. 12A and 12B in conjunction with a compression tool used during assembly and disassembly.
Figure 13B:
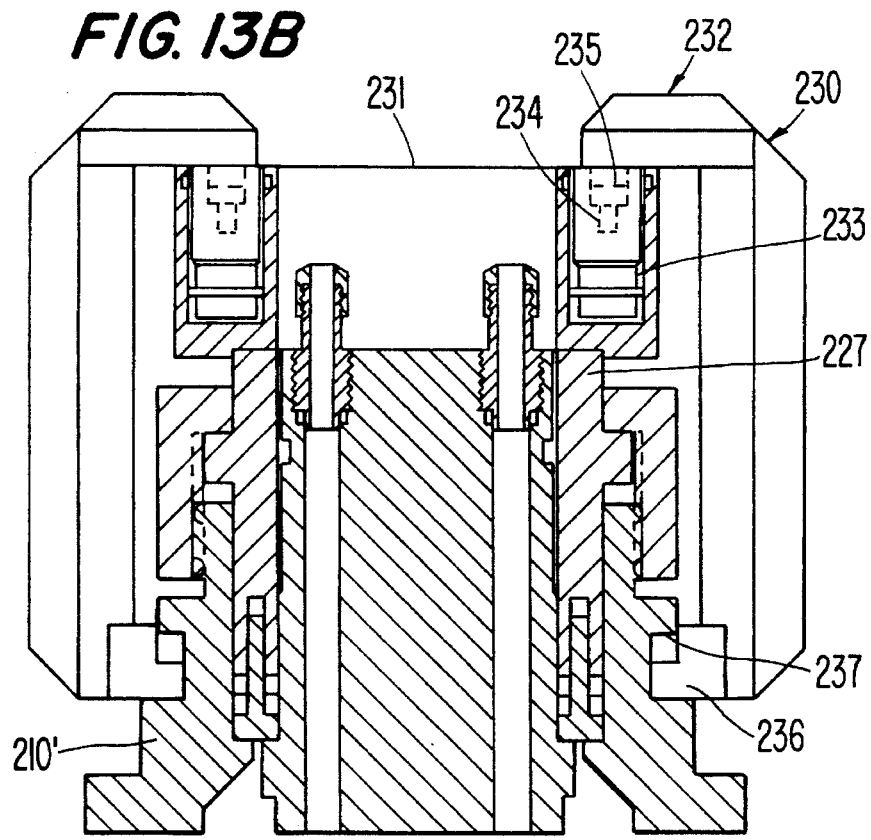

FIGS. 12A and 12B show the top end components of the nozzle assembly of the second embodiment. FIGS. 13A and 13B show the same view of the nozzle assembly as shown in FIGS. 12A and 12B, respectively, with the special hydraulic loading tool 230 in an operating position for compressing the compression collar 227. The loading tool 230 includes a tool block 231 and three load arms 232. Six hydraulic pistons 233 are spaced about the circumference of the tool block 231, each piston 233 having a recess 234 in an upper surface thereof. Each of the loading arms 232 includes a pair of protrusions 235 received in respective recesses 234 of the pistons 233 when the tool is installed. Each of the loading arms also includes bottom flanges 236 at a lower end thereof for engaging a flange 237 of the GRAYLOC hub 210'. The loading tool 230 is powered by a source of hydraulic pressure (not shown) for actuating the hydraulic pistons 233. The pressure source is connected to the tool through a fluid port 238.

To install the hydraulic loading tool 230, the tool block 231 is placed on the compression collar 227 of the nozzle assembly. Next, the three load arms 232 are inserted into the recesses 235 of the pistons, ensuring that the bottom flanges 236 of the load arms are located under the flange 237 of the GRAYLOC hub. Lastly, the fluid pressure source is connected to the fluid port 238 of the tool.

Operation of the tool 230 only involves pressurizing the pistons 233 to a predetermined pressure. As the pistons 233 rise due to the pressure, the bottom flanges 236 of the load arms 232 engage the flange 237 of the GRAYLOC hub 210'. As the pressure in the pistons 233 is increased, the load is transmitted through the compression collar 227 into the seals 226 of the seal carrier 224. While the tool 230 is pressurized, the drive nut 228 is turned down by hand to retain the compression collar 227, which in turn retains the load on the seals 226. The tool 230 is then depressurized, the load arms 232 removed, and the tool block 231 removed.

The initial installation of the quick locking mechanism of the present invention is relatively simple. The hubs 210' can be assembled to the closure head nozzles 211 when the head is in the storage area (i.e., off the critical path). As opposed to current plant procedures, once the GRAYLOC hub 210' is installed, the GRAYLOC clamps 213 and their corresponding large studs and nuts are not disassembled in subsequent outages. Similarly, the seal plug assemblies 220 are attached to the ICI guide tubes 221 and clusters 222 with fittings that remain connected during subsequent outages, unless the ICI is scheduled for replacement. The seal carrier assembly 224, compression collar 227, and hold down nut 228 can be easily assembled into proper position by sliding down over the ICI assemblies after the other components are attached as shown in FIG. 10A.

Figure 14:
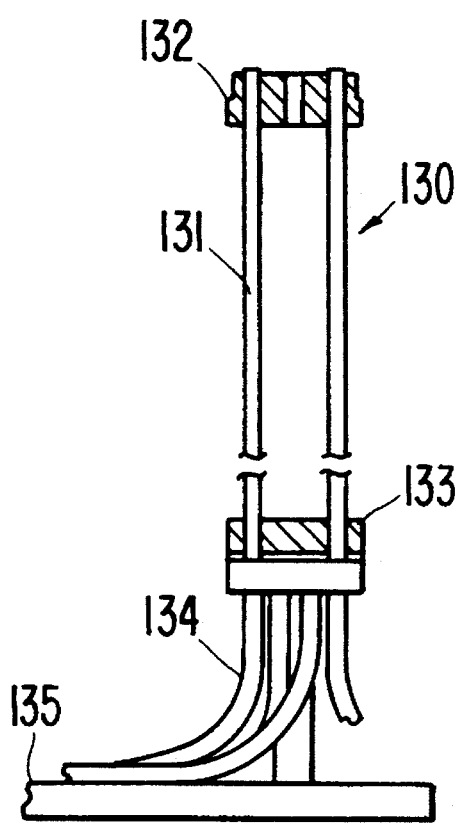
FIG. 14 is a sectional view of a conventional ICI guide tube cluster.

FIG. 14 shows a portion of a conventional ICI guide tube cluster 130 disposed within a pressure vessel. The guide tube cluster includes a plurality of guide tubes 131 (e.g., six) held in a bundle by support plates 132 and 133 at upper and lower ends of the cluster, respectively. The cluster 130 is connected at its lower end to extensions 134 of the ICI guide tubes which continue on into the pressure vessel and are supported by a thimble support plate 135.

Figure 15:
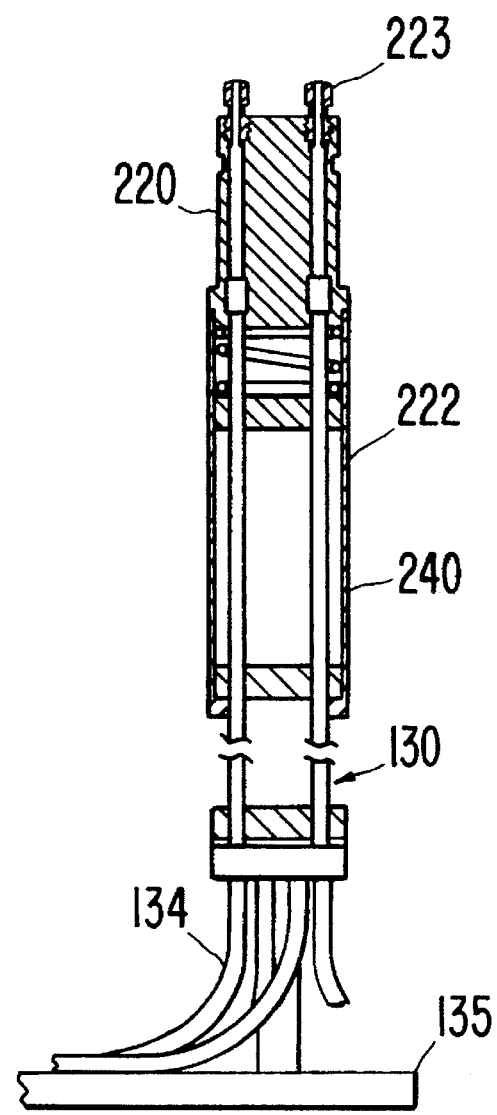
FIG. 15 is a sectional view of an ICI guide tube cluster according to the second embodiment of the present invention.
Figure 16:
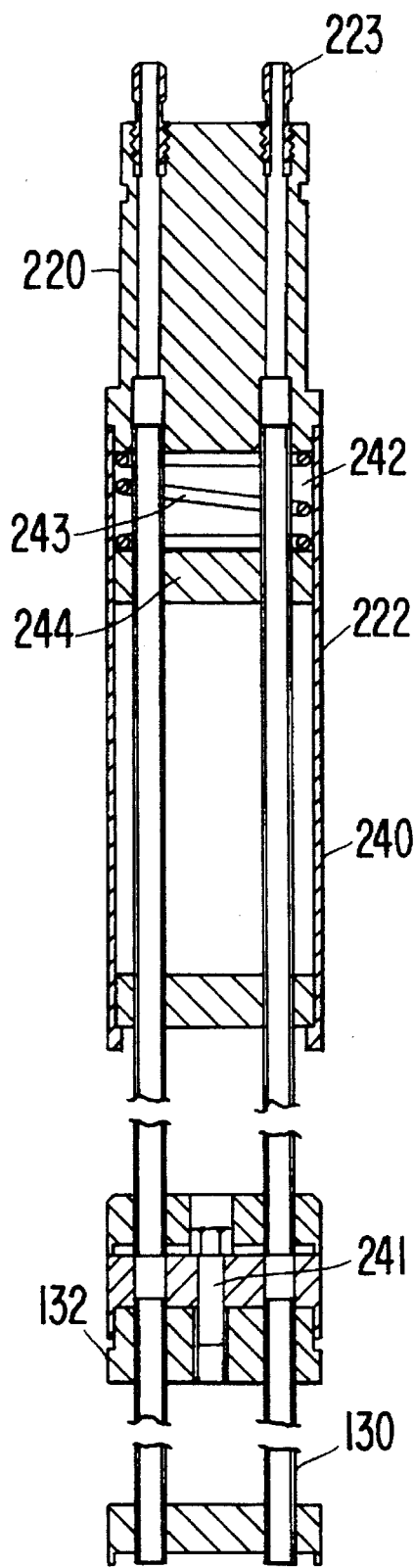
FIG. 16 is an enlarged sectional view of the ICI guide tube cluster shown in FIG. 15.

FIGS. 15 and 16 show the ICI guide tube cluster 222 according to the second embodiment of the present invention. The cluster 222 includes a new column assembly 240 that bolts onto the existing guide tube cluster 130. The connection between the existing cluster 130 and the new column assembly 240, as shown in FIG. 16, includes a threaded member 241 connecting the two portions for relatively easy retrofitting to the existing configuration.

The new guide tube cluster 222 includes a spring section 242 adjacent an upper end of the cluster to accommodate differential thermal growth between the reactor head and the internal components. The differential thermal growth often occurs because the reactor head is typically made of carbon steel while the internal components are typically made of stainless steel. The spring section 242 includes a compression spring 243 within the column assembly 240 between the seal plug assembly 220, which is connected directly to the column assembly 240, and a plate 244 secured within the column assembly 240.

The preferred embodiment uses Stainless and Nitronic 60 as the material combination for mating threaded parts, such as the nut 228 and the hub 210' to minimize the possibility of galling. As the reactor primary system is pressurized, the load on the GRAFOIL seal rings 226 actually increases causing a slight further compression of the seal rings 226. Therefore, the design has a self-sealing tendency. Furthermore, since all of the components of the present invention are relatively lightweight and there are virtually no torque requirements during assembly, one person can easily perform the assembly/disassembly operations.

Tables 1 through 4 provide a summary of the estimated time savings resulting from the use of the quick locking mechanism of the second embodiment of the present invention, as compared to the existing GRAYLOC flange design. The Tables use a typical nuclear power plant having only six flanges as an example. Since most power plants have either eight or ten flanges, the Tables present the most conservative time savings.

In addition, a further benefit not shown in the Tables is that with the present invention it is possible for a single person to assemble and disassemble the flange assemblies. The existing flange design requires two or more people to perform the same job. Therefore, the radiation exposure time savings directly incurred by the time savings of the present invention may be multiplied by two or more.

TABLE 1

| | Assembly Operations - ICIs NOT Being Replaced | | |
|---|---|---|---|
| | OPERATION* | EXISTING METHOD | QUICKLOC |
| 1 | Install GRAYLOC seal | 6 × 5 min. = 30 min. | 0 |
| 2 | Install GRAYLOC clamps | 6 × 10 min. = 60 min. | 0 |
| 3 | Install GRAYLOC bolts | 6 × 4 × 5 min. = 120 min. | 0 |
| 4 | Install GRAFOIL ICI seals | 28 × 5 min. = 140 min. | 0 |
| 5 | Install drive nuts | 28 × 10 min. = 280 min. | 0 |
| 6 | Install Seal Carrier | 0 | 6 × 1 min. = 6 min. |
| 7 | Install Compression Collar | 0 | 6 × 1 min. = 6 min. |
| 8 | Install Hold Down Nut | 0 | 6 × 1 min. = 6 min. |
| 9 | Compress Seals | 0 | 6 × 2 min. = 12 min. |
| 10 | Make electrical connections | 28 × 5 min. = 140 min. | 28 × 5 min. = 140 min. |
| | TOTAL TIME REQUIRED | 770 min. or 12.8 hrs. | 170 min. or 2.8 hrs. |
| | TIME SAVED | | 10.0 hrs. |

*All estimated installation times include the installation time and quality control verification time where applicable.

TABLE 2

Assembly operations - ICIs BEING Replaced

| | OPERATION* | EXISTING METHOD | QUICKLOC |
|---|---|---|---|
| 1 | Install GRAYLOC seal | 6 × 5 min. = 30 min. | 0 |
| 2 | Install GRAYLOC clamps | 6 × 10 min. = 60 min. | 0 |
| 3 | Install GRAYLOC bolts | 6 × 4 × 5 min. = 120 min. | 0 |
| 4 | Install GRAFOIL ICI seals | 28 × 5 min. = 140 min. | 0 |
| 5 | Install drive nuts | 28 × 10 min. = 280 min. | 0 |
| 6 | Install Seal Carrier | 0 | 6 × 1 min. = 6 min. |
| 7 | Install Compression Collar | 0 | 6 × 1 min. = 6 min. |
| 8 | Install Hold Down Nut | 0 | 6 × 1 min. = 6 min. |
| 9 | Compress Seals | 0 | 6 × 2 min. = 12 min. |
| 10 | Make SWAGELOC ICI Seals | 0 | 28 × 2 min. = 56 min. |
| 11 | Make electrical connections | 28 × 5 min. = 140 min. | 28 × 5 min. = 140 min. |
| | TOTAL TIME REQUIRED | 770 min. or 12.8 hrs. | 226 min. or 3.8 hrs. |
| | TIME SAVED | | 9.0 hrs. |

*All estimated installation times include the installation time and quality control verification time where applicable.

TABLE 3

Disassembly Operations - ICIs NOT Being Replaced

| | OPERATION | EXISTING METHOD | QUICKLOC |
|---|---|---|---|
| 1 | Disconnect hose clamp | 6 × 5 min. = 30 min. | 0 |
| 2 | Disconnect ICI Connectors | 28 × 1 min. = 28 min. | 28 × 1 min. = 28 min. |
| 3 | Remove drive nuts | 28 × 2 min. = 56 min. | 0 |
| 4 | Remove GRAFOIL ICI seals | 28 × 5 min. = 140 min. | 0 |
| 5 | Remove GRAYLOC bolts | 6 × 4 × 2 min. = 48 min. | 0 |
| 6 | Remove GRAYLOC clamps | 6 × 10 min. = 60 min. | 0 |
| 7 | Remove Crayloc seal | 6 × 1 min. = 6 min. | 0 |
| 8 | Compress seals | 0 | 6 × 2 min. = 12 min. |
| 9 | Remove Hold Down Nut | 0 | 6 × 1 min. = 6 min. |
| 10 | Remove Compression Collar | 0 | 6 × 1 min. = 6 min. |
| 11 | Remove Seal Carrier | 0 | 6 × 1 min. = 6 min. |
| | TOTAL TIME REQUIRED | 368 min. or 6.1 hrs. | 58 min. or 1.0 hrs. |
| | TIME SAVED | | 5.1 hrs. |

TABLE 4

Disassembly Operations - ICIs Being Replaced

| | OPERATION | EXISTING METHOD | QUICKLOC |
|---|---|---|---|
| 1 | Disconnect hose clamp | 6 × 5 min. = 30 min. | 6 × 5 min. = 30 min. |
| 2 | Disconnect ICI Connectors | 28 × 1 min. = 28 min. | 28 × 1 min. = 28 min. |
| 3 | Remove drive nuts | 28 × 2 min. = 56 min. | 0 |
| 4 | Remove GRAFOIL ICI seals | 28 × 5 min. = 140 min. | 0 |
| 5 | Remove GRAYLOC bolts | 6 × 4 × 2 min. = 48 min. | 0 |
| 6 | Remove GRAYLOC clamps | 6 × 10 min. = 60 min. | 0 |
| 7 | Remove GRAYLOC seal | 6 × 1 min. = 6 min. | 0 |
| 8 | Loosen SWAGELOC fittings | 0 | 28 × 1 min. = 28 min. |
| 9 | Compress seals | 0 | 6 × 2 min. = 12 min. |
| 10 | Remove Hold Down Nut | 0 | 6 × 1 min. = 6 min. |
| 11 | Remove Compression Collar | 0 | 6 × 1 min. = 6 min. |
| 12 | Remove Seal Carrier | 0 | 6 × 1 min. = 6 min. |
| | TOTAL TIME REQUIRED | 368 min. or 6.1 hrs. | 116 min. or 1.9 hrs. |
| | TIME SAVED | | 4.2 hrs. |

It will be appreciated that the present invention is not limited to the exact construction which has been described above and which is illustrated in the accompanying FIGS. 2 to 5, 9 to 13B, 15 and 16, and that various modifications and changes can be made without departing from the scope thereof. It is intended that the scope of the invention only be limited by the appended claims.

What is claimed is:

1. A nozzle assembly for use with a sealed containment vessel, comprising:

a hub which is clamped to a flange formed on the upper end of a nozzle in a manner to establish a hermetic seal between the hub and the flange, said hub being formed with a stepped bore therein;

a plug member extending through said stepped bore in said hub;

seal means disposed in said bore about said plug member for creating a seal between said plug member and said hub;

a compression collar disposed about said plug member, said compression collar having a first end adapted to engage and press said seal means into sealing engagement with said stepped bore, a second end opposite said first end, and a flange intermediate said first and second ends; and a retaining nut threaded onto said hub, said retaining nut having a retaining portion engaging said flange of said compression collar to maintain said collar in pressing engagement with said seal means to create a hermetic seal between said hub and said plug member.

2. The nozzle assembly as set forth in claim 1, wherein said second end of said compression collar extends outside said retaining nut such that the collar can be engaged and compressed by an external source prior to threading said retaining nut onto said hub.

3. The nozzle assembly as set forth in claim 2, wherein said plug member includes a plurality of bores extending therethrough, and further comprising a plurality of instrument guide tubes extending through said bores in the plug member, said guide tubes being hermetically sealed to said plug member.

4. The nozzle assembly as set forth in claim 3, wherein said plug member includes a stepped portion for receiving said seal means.

5. The nozzle assembly as set forth in claim 4, wherein said stepped portion of said plug member is adjacent a stepped portion of the stepped bore of the hub.

6. The nozzle assembly as set forth in claim 1, wherein said seal means comprises a seal carrier disposed in the bore of said hub about said plug member, and at least one graphite containing sealing member carried by the seal carrier.

7. The nozzle assembly as set forth in claim 6, wherein said seal carrier includes a plurality of J-shaped slots to facilitate installation and removal of the seal means.

8. In a nuclear reactor including an in-core instrument, a head which is lifted when the reactor is refuelled, and a nozzle through which the in-core instrument is disposed, a nozzle arrangement comprising:

a flange formed about an upper portion of said nozzle;

a hub releasably connected to said flange;

a plug member having a bore through which said in-core instrument is disposed;

a stepped bore formed in said hub through which said plug member is disposed;

seal means disposed in said stepped bore about said plug member for creating a seal between said plug member and said hub;

a compression collar disposed about said plug member, said compression collar having a first end for engaging and pressing said seal means into sealing relationship with said hub and said plug member, a second end opposite said first end, and an abutment flange intermediate said first and second ends; and a retaining nut threadedly received on said hub and engaging said abutment flange on said compression collar to retain said collar in pressing engagement with said seal means.

9. The nuclear reactor as set forth in claim 8, wherein said second end of said compression collar extends outside said retaining nut such that the collar can be engaged and compressed by an external source while threading said retaining nut onto said hub.

10. The nuclear reactor as set forth in claim 9, wherein said plug member includes a stepped portion for receiving said seal means, said stepped portion of the plug member engaging said seal means to provide a self-sealing tendency when the reactor is pressurized.

11. The nuclear reactor as set forth in claim 10, wherein said stepped portion of said plug member is adjacent a stepped portion of the stepped bore of the hub.

12. The nuclear reactor as set forth in claim 9, wherein said compression collar is generally cylindrical-shaped and said abutment flange extends radially outwardly from an outer side wall thereof.

13. The nuclear reactor as set forth in claim 9, wherein said plug member includes a plurality of bores extending therethrough, and said in-core instrument comprises a plurality of instrument guide tubes extending through said bores in the plug member, said guide tubes being hermetically sealed to said plug member.

14. The nuclear reactor as set forth in claim 13, further comprising a bullet nose means for creating a sealed chamber about said instrument guide tubes above said plug member during refueling of said reactor, said bullet nose means having an upper tapered end and a lower end for sealing engagement with said plug member.

15. The nuclear reactor as set forth in claim 14, wherein said bullet nose and said plug member both have a smaller diameter than the stepped bore formed in said hub.

16. The nuclear reactor as set forth in claim 9, further comprising a loading tool for engaging and compressing said second end of said compression collar while threading said retaining nut onto said hub.

17. The nuclear reactor as set forth in claim 16, wherein said loading tool comprises a tool block for engaging said compression collar and a plurality of load arms connected between said tool block and said reactor, said tool block having a means for receiving fluid pressure for creating a load on said compression collar while threading said retaining nut onto said hub.

18. The nuclear reactor as set forth in claim 17, wherein said in-core instrument includes a guide tube column assembly attached to a bottom end of said plug member, said column assembly including a spring section means for accommodating differential thermal growth between the reactor head and the in-core instrument.

19. The nuclear reactor as set forth in claim 8, wherein said seal means comprises a seal carrier disposed in the bore of said hub about said plug member, and at least one graphite containing sealing member carried by the seal carrier.

20. The nuclear reactor as set forth in claim 19, wherein said seal carrier includes a plurality of J-shaped slots to facilitate installation and removal of the seal means.

21. A method of connecting an instrument assembly to a nozzle opening of a sealed containment vessel, comprising the steps of:

providing a seal plug assembly with at least one instrument guide tube extending therethrough;

inserting said seal plug assembly into a hub of said nozzle opening so that said instrument guide tube extends into said sealed vessel;

placing a compression collar about said seal plug assembly;

compressing said compression collar to form a seal between said seal plug assembly and said hub of the nozzle opening; and threading a hold down nut onto said hub of the nozzle opening after said compression collar is compressed so as to engage and maintain compression in said compression collar.

22. The method of connecting an instrument assembly as set forth in claim 21, wherein the step of compressing said compression collar comprises engaging a first portion of said compression collar with a hydraulic compression tool.

23. The method of connecting an instrument assembly as set forth in claim 22, wherein the step of threading a hold down nut onto said hub of the nozzle opening comprises engaging a second portion of said compression collar with said hold down nut while said compression collar is being compressed by said compression tool.

24. The method of connecting an instrument assembly as set forth in claim 23, further comprising the step of removing said compression tool from engagement with said compression collar while maintaining said hold down nut in engagement with said compression collar.

25. The method of connecting an instrument assembly as set forth in claim 24, further comprising the step of placing a seal carrier assembly about said seal plug assembly before placing said compression collar about said seal plug assembly, wherein said compression collar engages said seal carrier assembly upon being compressed and causes said seal carrier assembly to form the seal between said hub and said seal plug assembly.

* * * * *